United States Patent
Chung

(10) Patent No.: US 8,083,356 B2
(45) Date of Patent: Dec. 27, 2011

(54) METHODS AND SYSTEMS FOR IMPROVING OPERATION OF A VIDEO PROJECTOR

(75) Inventor: Yau Wing Chung, Fremont, CA (US)

(73) Assignee: Optoma Technology, Inc., Milpitas, CA (US)

( * ) Notice: Subject to any disclaimer, the term of this patent is extended or adjusted under 35 U.S.C. 154(b) by 0 days.

(21) Appl. No.: 12/357,961

(22) Filed: Jan. 22, 2009

(65) Prior Publication Data

US 2009/0122269 A1     May 14, 2009

Related U.S. Application Data

(63) Continuation of application No. 11/272,644, filed on Nov. 15, 2005, now abandoned.

(60) Provisional application No. 60/703,433, filed on Jul. 29, 2005.

(51) Int. Cl.
*G03B 21/16* (2006.01)
*G03B 21/20* (2006.01)

(52) U.S. Cl. .......................... 353/57; 353/52

(58) Field of Classification Search ............... 353/52, 353/57, 60, 61, 62
See application file for complete search history.

(56) References Cited

U.S. PATENT DOCUMENTS

| | | | | |
|---|---|---|---|---|
| 5,136,397 A * | 8/1992 | Miyashita | ...... | 348/748 |
| 7,040,762 B2 * | 5/2006 | Yasuda | ...... | 353/52 |
| 7,048,382 B2 * | 5/2006 | Pate | ...... | 353/52 |
| 7,075,596 B2 * | 7/2006 | Hosoda | ...... | 349/72 |
| 7,131,731 B2 * | 11/2006 | Oketani | ...... | 353/57 |
| 7,229,177 B2 * | 6/2007 | Nagano | ...... | 353/52 |
| 7,484,852 B2 * | 2/2009 | Kuraie | ...... | 353/57 |
| 2002/0118160 A1 * | 8/2002 | Nakamura et al. | ...... | 345/101 |
| 2003/0020884 A1 * | 1/2003 | Okada et al. | ...... | 353/57 |

* cited by examiner

*Primary Examiner* — William C Dowling
(74) *Attorney, Agent, or Firm* — MH2 Technology Law Group LLP

(57) ABSTRACT

A method of operating a video device includes determining an operating temperature, determining if the operating temperature is above normal operating temperature for the video projector, and setting the video projector in economy mode if the operating temperature is above the normal operating temperature.

11 Claims, 12 Drawing Sheets

METHODS AND SYSTEMS FOR IMPROVING OPERATION OF A VIDEO PROJECTOR

CROSS-REFERENCE TO RELATED APPLICATIONS

This is a continuation of application Ser. No. 11/272,644 filed Nov. 15, 2005 now abandoned and priority to U.S. Provisional Patent Application Ser. No. 60/703,433 filed on Jul. 29, 2005, the disclosures of which are incorporated in their entirety by reference herein.

FIELD

Aspects of the present invention generally relate to video display methods and systems.

BACKGROUND

Traditional video projection devices operate within a defined temperature range. Traditional devices use a thermal switch to determine the temperature of the device. Once the device moves outside of this range, the thermal switch cuts power to the device in order to prevent the device from overheating. However, a user is not given warning that the device is about to power down. Also, the thermal switch doesn't give the video device flexibility in reducing power instead of powering down. Additionally, the thermal switch does not take into account other environmental conditions such as air pressure.

SUMMARY

Aspects of the present invention concern a method for operating a video projector. The method includes determining an operating temperature, determining if the operating temperature is above normal operating temperature for the video projector, and setting the video projector in economy mode if the operating temperature is above the normal operating temperature.

Additionally, aspects of the present invention concern a video device. The video device includes a video projector, a controller coupled to the video projector, a light source coupled to the controller for illuminating the video projector to produce video, a temperature sensor coupled to the controller, logic coupled to the controller, the temperature sensor, and the light source for determining an operating temperature, logic coupled to the controller, the temperature sensor, and the light source for determining if the operating temperature is above normal operating temperature for the video projector, and logic coupled to the controller, the temperature sensor, and the light source for setting the video projector in economy mode if the operating temperature is above the normal operating temperature.

Additional aspects of the present invention will be set forth in part in the description which follows, and in part will be obvious from the description, or may be learned by practice of the invention. The aspects of the present invention will be realized and attained by means of the elements and combinations particularly pointed out in the appended claims.

Further, it is to be understood that both the foregoing general description and the following detailed description are exemplary and explanatory only and are not restrictive of the present invention, as claimed.

BRIEF DESCRIPTION OF THE DRAWINGS

The accompanying drawings, which are incorporated in and constitute a part of this specification, illustrate several aspects of the present invention and together with the description, serve to explain the principles of the invention.

DETAILED DESCRIPTION

Aspects of the present invention relate to systems and methods which improve the operation of a video projection device. A video projection device includes a temperature sensor for measuring the operating temperature of the device. If the temperature of the device moves outside a normal operating range but not above a critical temperature, the device is placed in economy mode instead of being powered down. Thus, the device may continue to operate at higher temperatures.

Further, if the device is operating in economy mode because it is above normal temperature, the device display displays a notice image to the user to remind the user that the device is operating in economy mode. If the device moves above a critical temperature, the device displays a notice image to warn a user the device is powering down. Additionally, the device includes an air pressure sensor to measure air pressure.

Additionally, the temperature at which the display device returns to normal mode from economy mode may be set different from the normal operating range. By setting the temperature at which the display device returns to normal mode from economy mode different from the normal operating range, the display device may be prevented from oscillating between economy and normal modes if the operating temperature is varying around the limits of the normal operating range.

Reference will now be made in detail to various aspects of the present invention, examples of which are illustrated in the accompanying drawings. Wherever possible, the same reference numbers will be used throughout the drawings to refer to the same or like parts.

Figure 1:
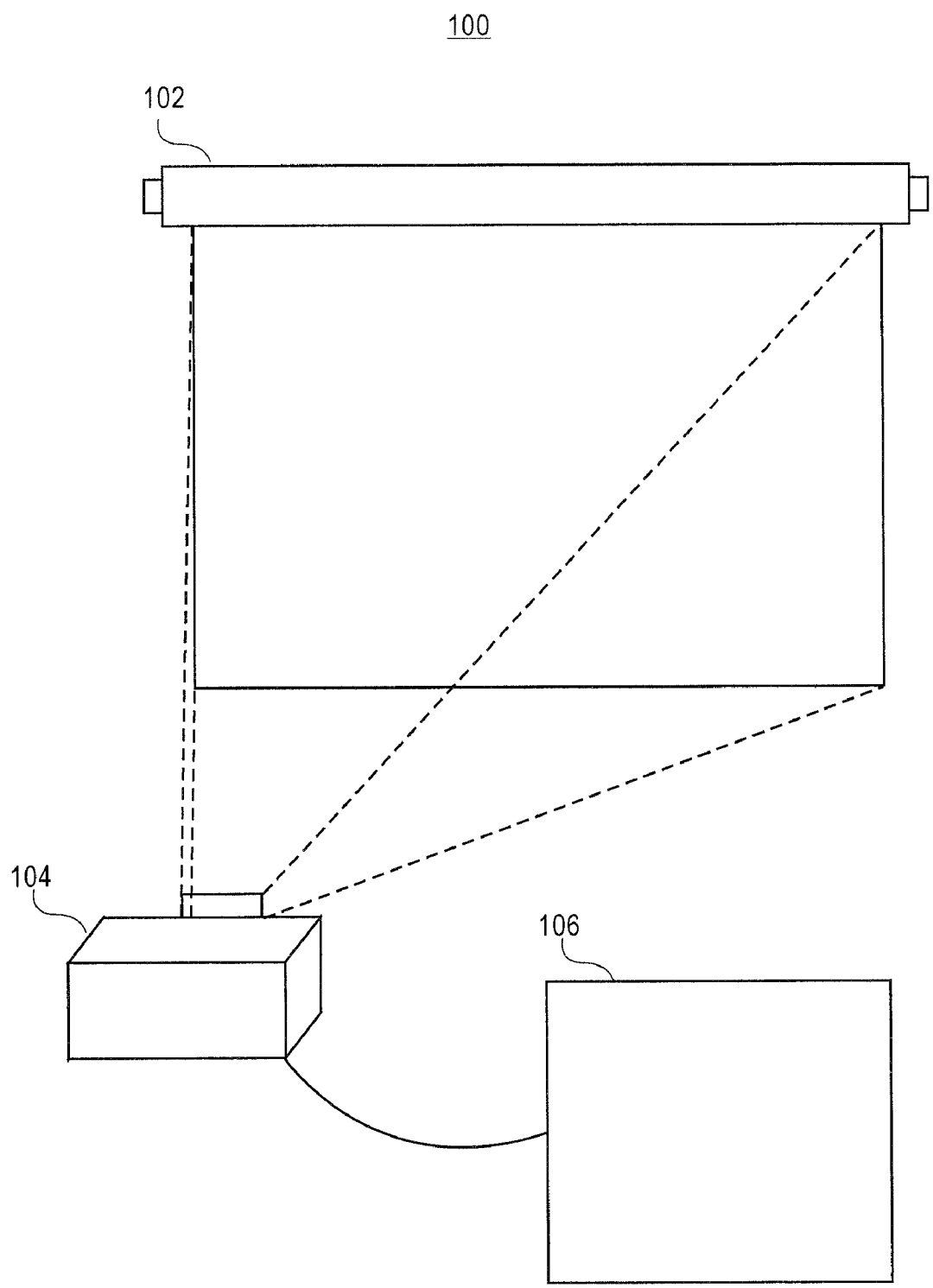
FIG. 1 is a diagram illustrating a system for displaying a video consistent with aspects of the present invention.

FIG. 1 illustrates a system 100 for displaying video consistent with aspects of the present invention. System 100 includes a display screen 102 for viewing video projected from a video projector 104. System 100 further includes a video source 106 which transmits a video signal to video projector 104. The video projected onto display screen 102 may be moving video or still images. Video projector 104 may be any type of video projector capable of receiving a video signal and converting the video signal to a viewable image to be displayed on display screen 102. For example, video projector 104 may be a digital light processing ("DLP") video projector, a liquid crystal ("LCD") video projector, or cathode-ray tube ("CRT") projector.

As illustrated in FIG. 1, video source 106 supplies video projector 104 with a video signal to be displayed on video screen 102. Video source 106 may be any standard video equipment capable of generating a video signal readable by video projector 104. For example, video source 106 may be a Digital Versatile Disk ("DVD") player, laser disk player, Compact Disk ("CD") player, Video CD ("VCD") player, VHS player/recorder, Digital Video Recorder ("DVR"), video camera, video still camera, cable receiver box, or satellite receiver box. Video source 106 may also be a standard laptop or desktop computer. One skilled in the art will realize that the preceding list of standard video equipment is exemplary and video source 106 may be any device capable of generating a video signal readable by video projector 104. Furthermore, video source 106 may be integrated with video projector 104. Additionally, video projector 104 may be coupled to multiple video sources 106.

Figure 2:
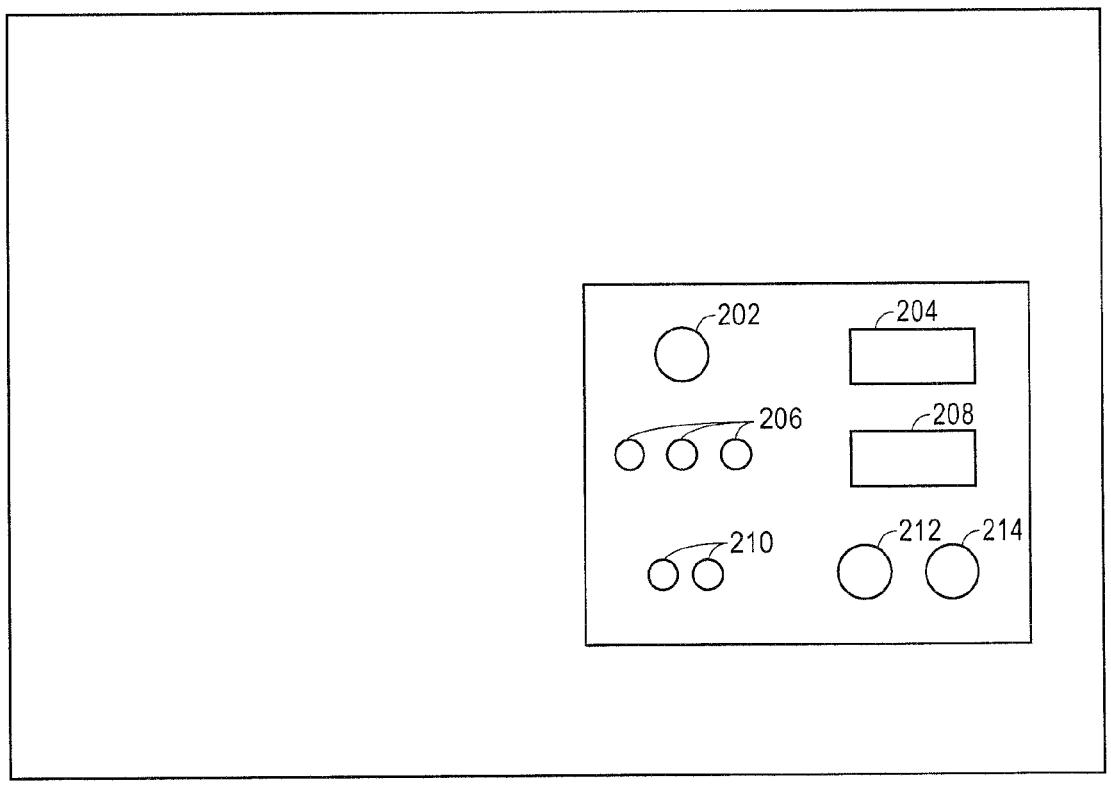
FIG. 2 is a rear view diagram illustrating a system for displaying a video consistent with aspects of the present invention.

FIG. 2 is a back view of video projector 104 illustrating input/output ports 200 for sending and receiving signals consistent with aspects of the present invention. Video source 106 may be coupled to one of the input/output ports 200. As illustrated in FIG. 2, input/output ports 200 include a S-video input 202, DVI-I input 204, component video input 206, VGA input 208, audio input 210, coaxial video input 212, and coaxial audio input 214.

Input/output ports 200 may include additional input and output ports. For example, input/output ports 200 may include ports any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 200 may include any port capable of sending or receiving an electrical signal. Input/output ports 200 are coupled to the internal components of video projector 104.

Figure 3A:
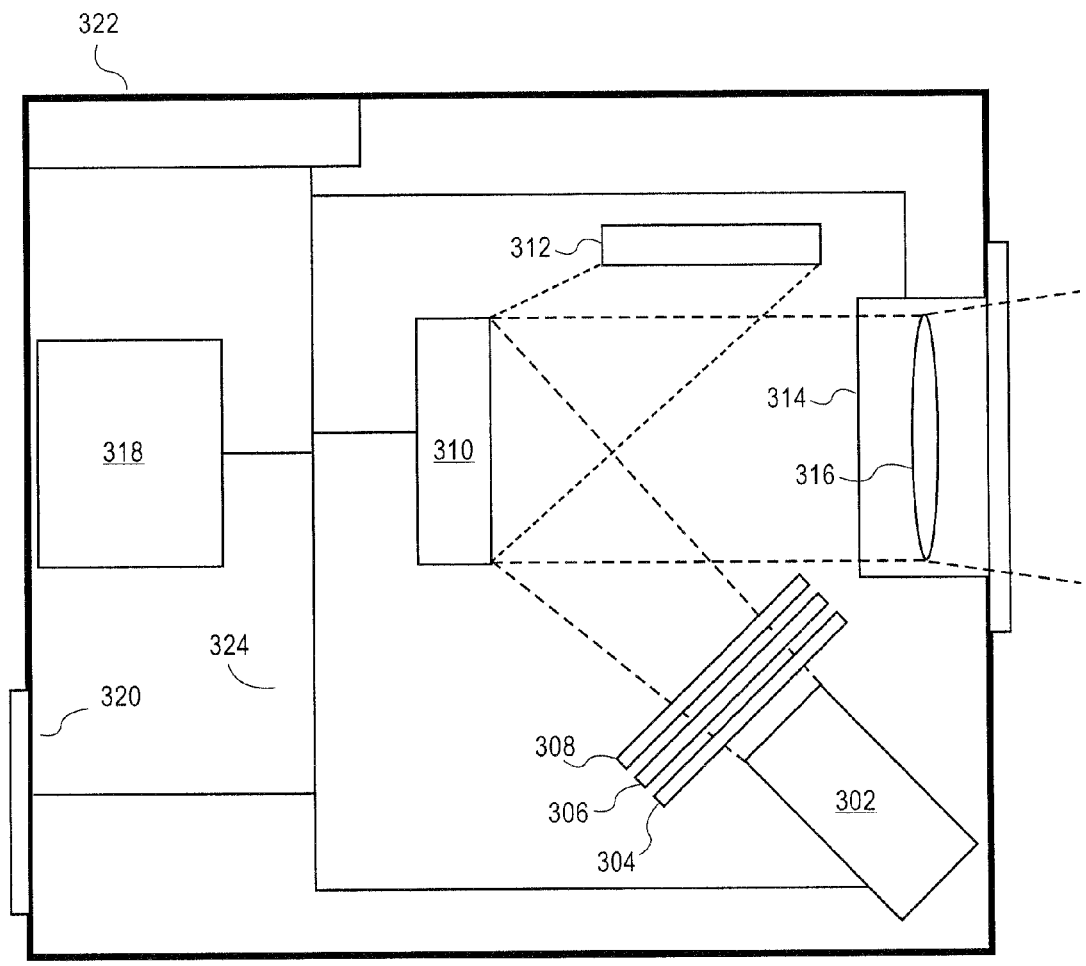
FIG. 3a is a diagram illustrating a DLP video projector consistent with aspects of the present invention.

FIG. 3a illustrates an exemplary DLP video projector 300 which may be used as video projector 104. DLP video projector 300 is an example of one type of projector which may be used with system 100. One skilled in the art will understand that any type of video projector may be used with system 100 such as a CRT projector or an LCD projector.

DLP video projector 300 may include a controller 318 and a bus 324. Controller 318 may include components to control and monitor DLP video projector 300. For example, controller 318 may include a processor, non-volatile memory, and mass storage. All the components of DLP video projector 300 may be coupled to bus 324 to allow all the components to communicate with controller 318 and one another. DLP video projector 300 includes a fan 322 to cool DLP video projector 300. Fan 322 may be coupled to bus 324. DLP video projector 300 also includes a power supply (not shown) coupled to all the components.

DLP video projector 300 contains a light source 302 for generating light to produce a video image. Light source 302 may be, for example, an ultra-high performance ("UHP") lamp capable of producing from 50-500 watts of power. Light source 300 may be coupled to bus 324 to communicate with other components. For example, controller 318 or DLP circuit board 310 may control the brightness of light source 302.

Light generated by light source 302 passes though optics 304, 308 and color filter 306. Optics 304 and 308 may be, for example, a condenser and a shaper, respectively, for manipulating the light generated by light source 302. Color filter 306 may be, for example, a color wheel capable of spinning at various speeds to produce various colors.

Video projector 300 also contains a DLP circuit board 310. DLP circuit board 310 may include a digital micro-mirror device, a processor, and memory. For example, DLP circuit board 310 may be a DARKCHIP2 or DARKCHIP3 DLP chip manufactured by TEXAS INSTRUMENTS. DLP circuit board 310 is coupled to bus 324 to receive the video signal received from input/output ports 320 and to communicate with controller 318. DLP circuit board 310 reflects light from light source 302 using the digital micro-mirrors and generates video based on the video signal to be displayed on video screen 202. DLP circuit board 310 reflects light not used for the video onto light absorber 312. Light reflected by DLP circuit board 310 used for the video passes through lens housing 314 and lens 316. Lens 316 focuses the video to be displayed on display screen 102. Lens housing 314 may include a manual lens moving mechanism or a motor to automatically move lens 316. The manual lens moving mechanism or motor allows the position of lens 316 and, as a result, shift the position of the video displayed on display screen 102. The shifting may be achieved by moving lens 316 in any combination of the x, y, or z directions.

DLP video projector 300 also includes input/output ports 320. Input/output ports 320 may be a single port or multiple ports. Input/output ports 320 enables DLP video projector to receive video signals, receive signals from a remote control device, and output signals to other sources. For example, input/output ports 320 may include ports as illustrated in FIG. 2 or any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 320 may include any port capable of sending or receiving an electrical signal. Input/output ports 320 are coupled to bus 324. Signals input into DLP video projector 300 may be transferred to the various components of DLP video projector 300 via bus 324. Likewise, signals output of DLP video projector 300 may be transferred to input/output ports 320 via bus 324.

Figure 3B:
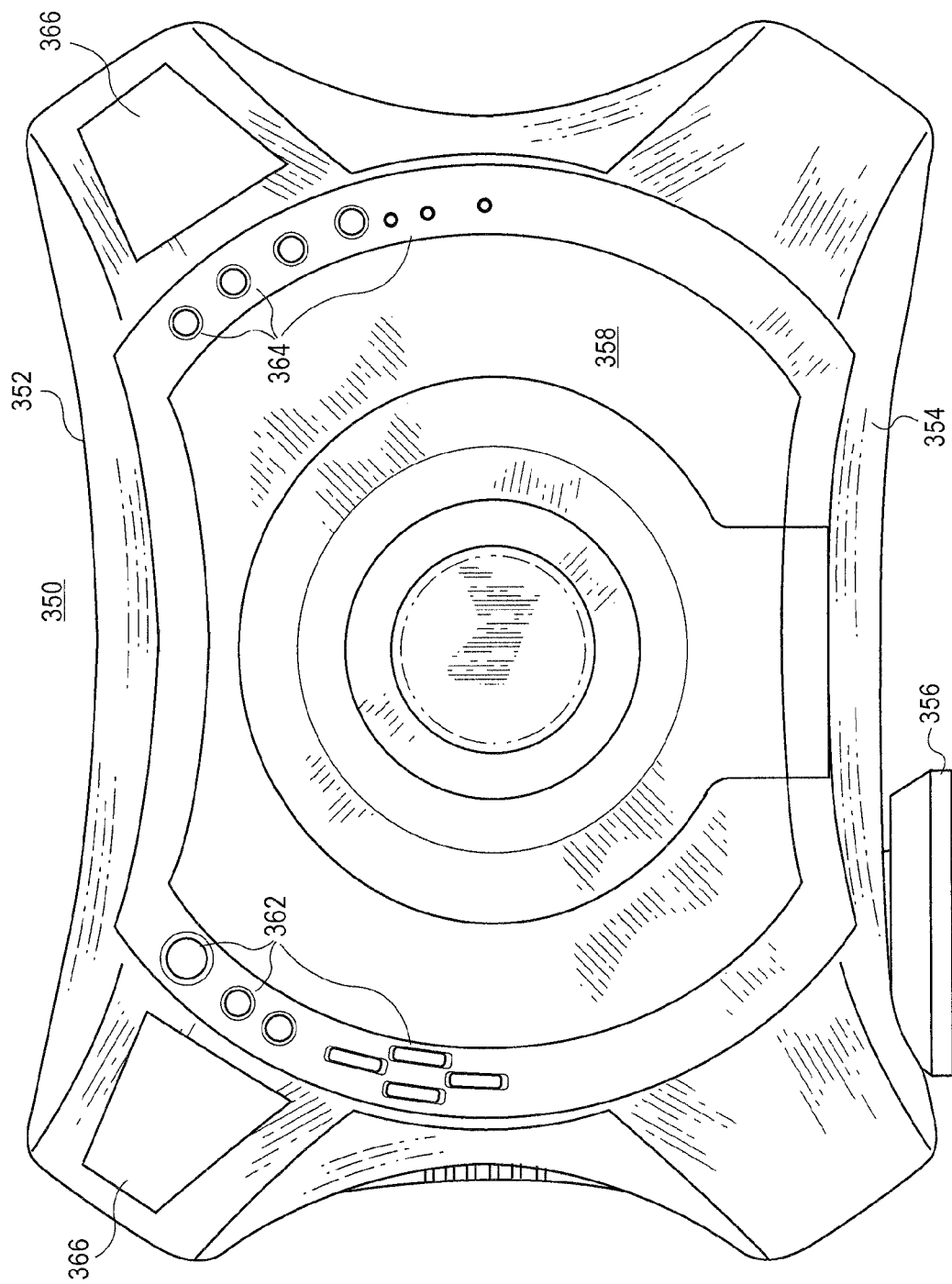
FIGS. 3b-f are various views illustrating an integrated video projector and video source consistent with aspects of the present invention.

As stated above, video source 106 may be integrated with video projector 104. FIGS. 3b-f are various views of a video projection system 350 which includes a video source and video projector integrated into a single housing 352 consistent with aspects of the present invention. Video projection system 350 may be utilized as system 104 in video system 100. FIG. 3b is a top view of video projection system 350 consistent with aspects of the present invention. As shown in FIG. 3b, video projection system 350 includes video projector 354 and a video source 358 in a single housing. For example, video projector 354 may be a DLP projector and video source 358 may be a DVD player. Video projection system 350 includes a lens housing 356 located in a front portion of video projector 354. Lens housing 356 may include various lens used in projecting video onto a display screen. Further, video source 358 includes a tray 360 for housing media read by video source 358. For example, if video source 358 is a DVD player, tray 360 may house DVD discs.

Further, as illustrated in FIG. 3b, video projection system 350 includes projector controls 362 for operating video projector 354. For example, projector controls 362 may be a power switch, zoom controls, input/output select controls, and picture mode controls. Video projection system 350 also includes video source controls 364. For example, video source controls 364 may be tray open/close controls, play/stop controls, and video search controls for operating video source 358. Video projection system 350 may also be controlled by a remote device (not shown). For example, a remote device may include redundant projector controls 362 and video source controls 364. Video projection system 350 also includes speakers 366 for presenting sounds corresponding to video generated by video projection system 350.

Figure 3C:
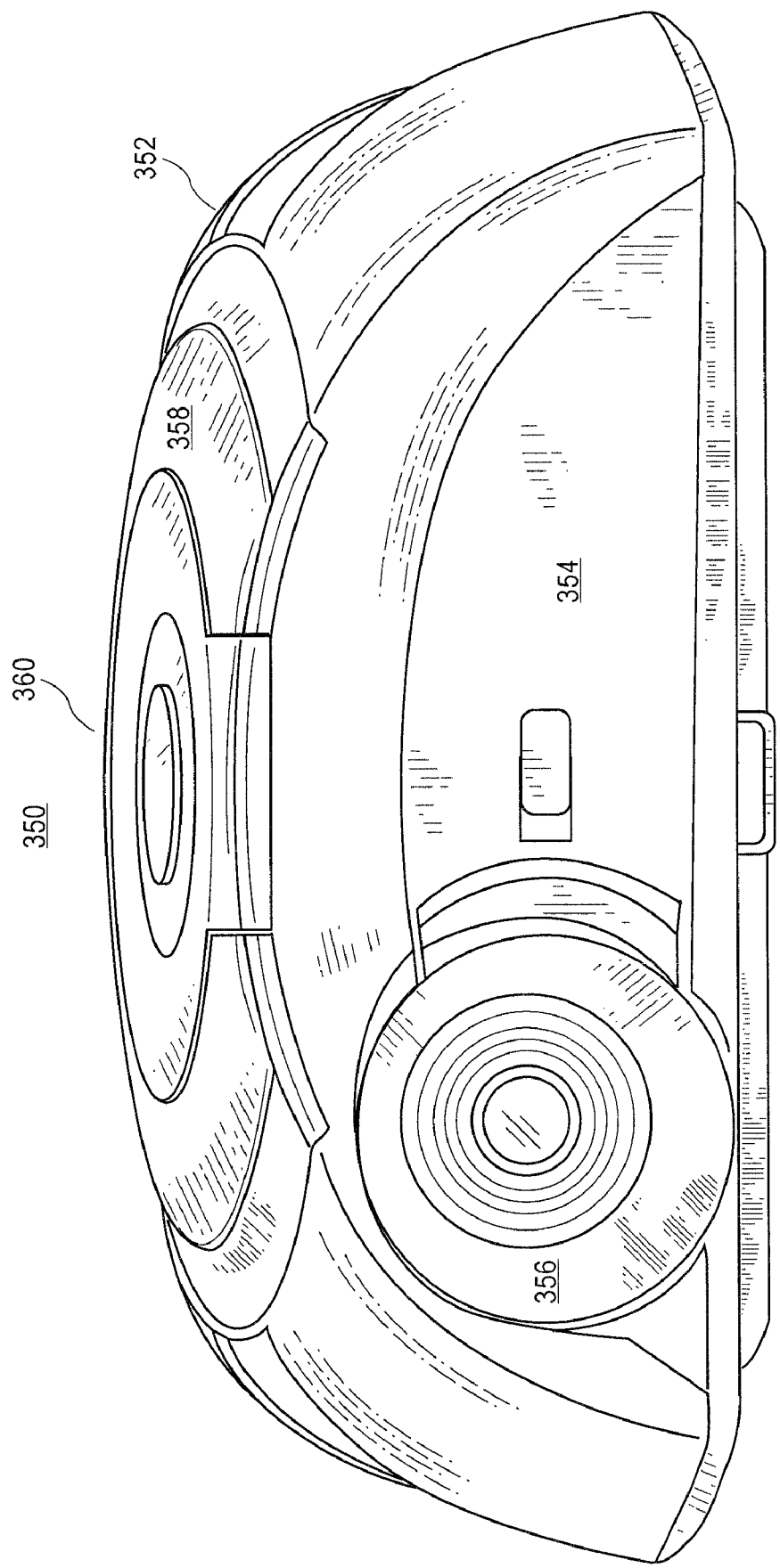
Figure 3D:
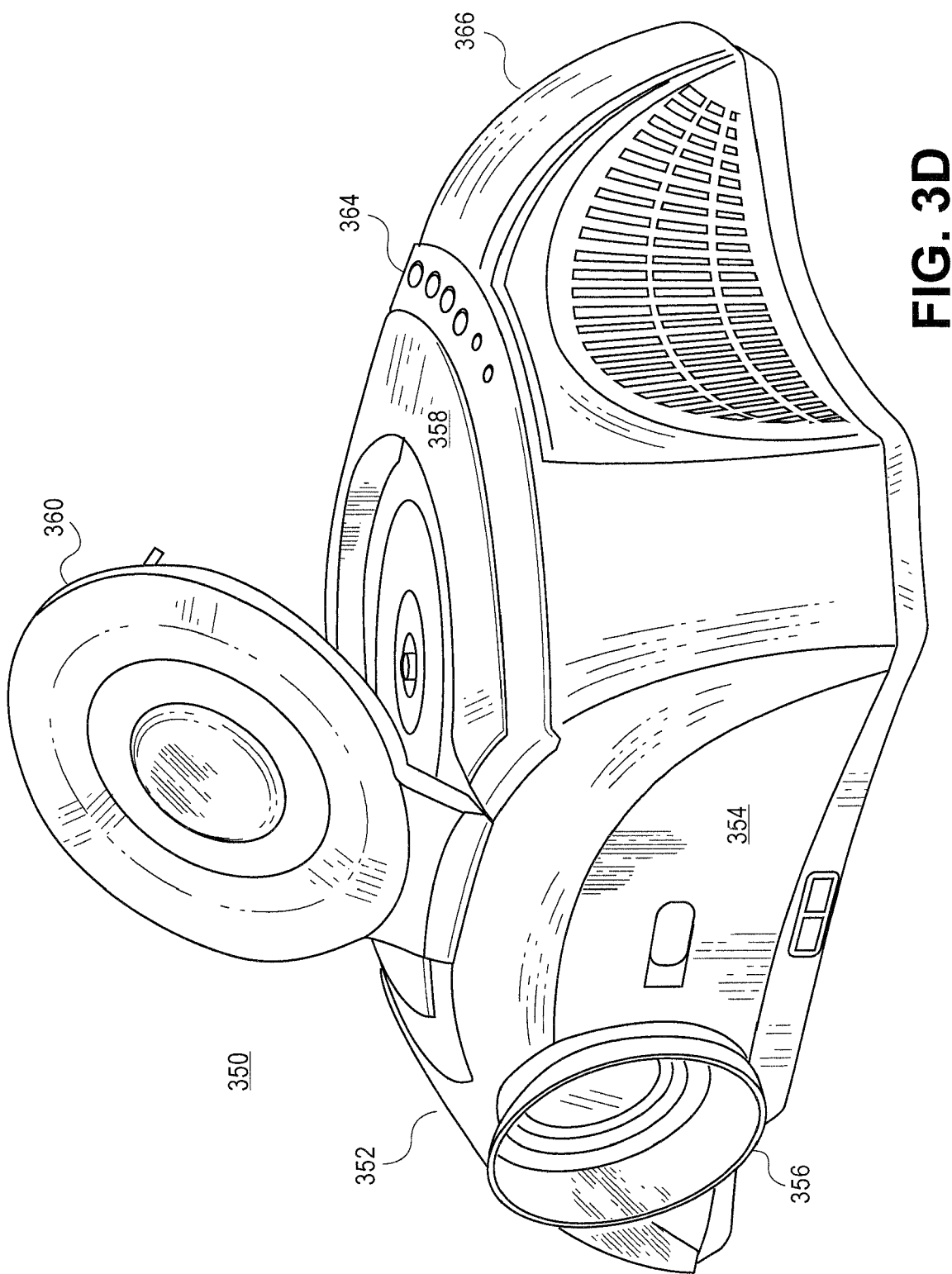

FIG. 3c is a front view of video projection system 350. As shown in FIG. 3c, lens housing 356 is located in the front portion of housing 352 of video projection system 350. Further, video source 358 and tray 360 may be housed in the top portion of housing 352 of projection system 350. FIG. 3d is another front view of video projection system 350. FIG. 3d illustrates video projection system 350 when tray 360 is open for inserting media to be played by video source 358.

Figure 3E:
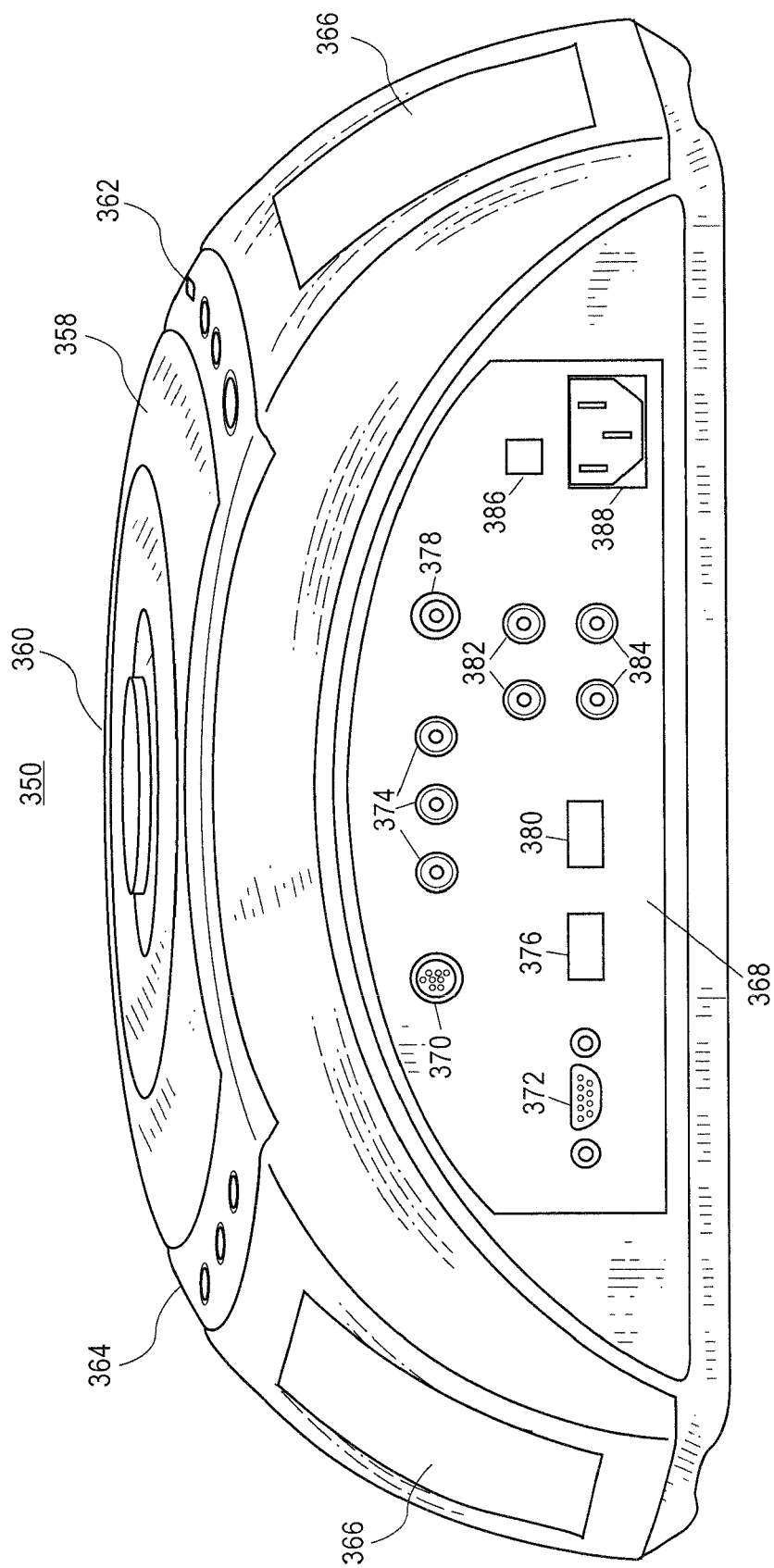

FIG. 3e is a rear view of video projection system 350. As illustrated in FIG. 3e, input/output ports 368 are located in a rear portion of housing 352 of video projection system 350. For example, input/output ports 368 may include an S-video input 370, DVI-I input 372, component video input 374, VGA input 376, composite video input 378, RS-232 port 380, audio input 382, audio output 384, and optical audio output 386, and power input 388. Input/output ports 368 may include additional input and output ports (not shown). For example, input/output ports 368 may include ports any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 368 may include any port capable of sending or receiving an electrical signal.

Further, as illustrated in FIG. 3e, speakers 366 are located in the sides of the rear portion of housing 352 of video projection system 350. Of course, speakers 366 may also be located in other portions of housing 352. In addition, video projection system 350 may be coupled to other speakers (not shown) that are external to housing 352.

Figure 3F:
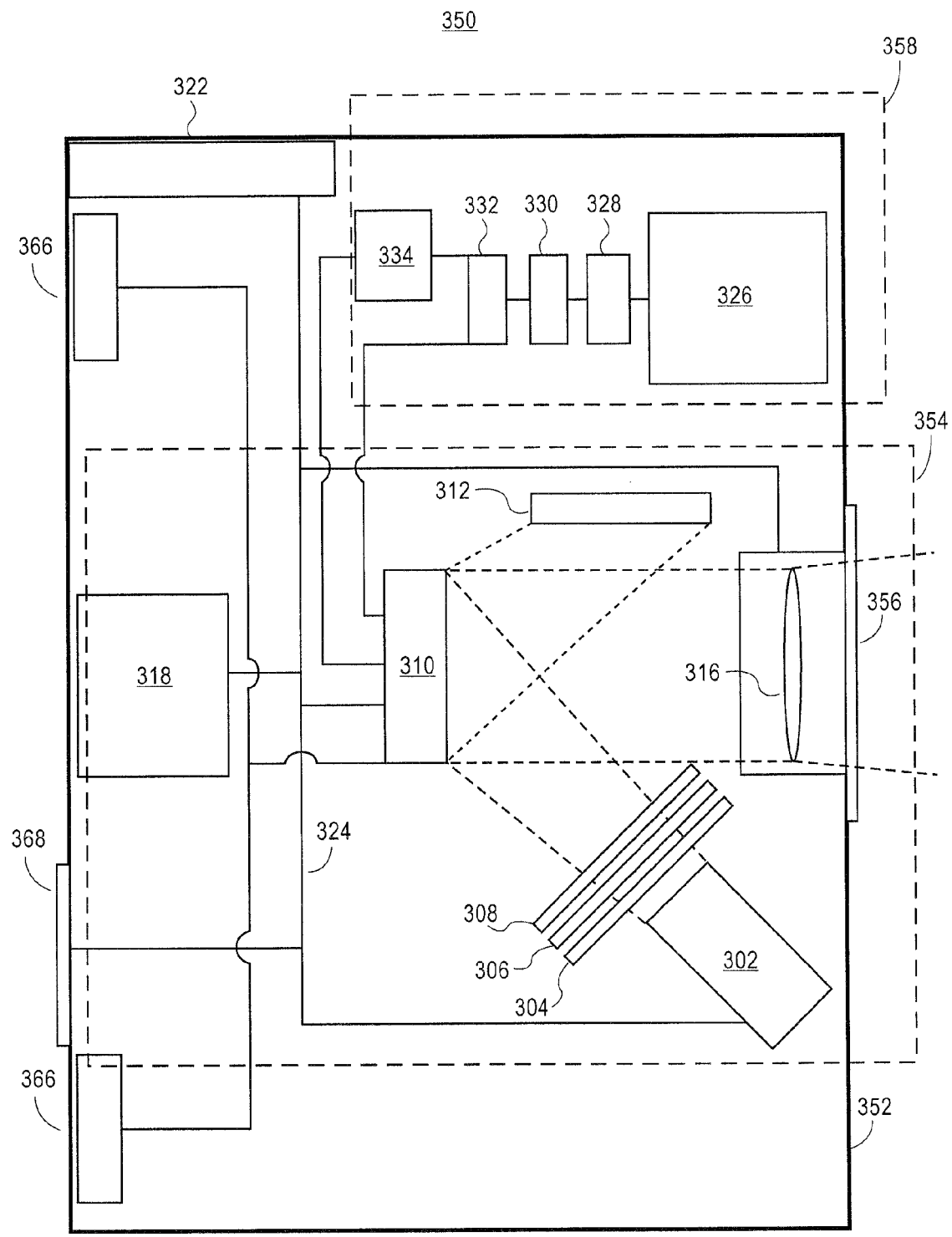

FIG. 3f is a block diagram illustrating internal components of video projection system 350 consistent with aspects of the present invention. As illustrated in FIG. 3f, video projection system 350 includes a DLP video projector 354 and a DVD player 358 integrated into a single housing 352. DLP video projector 354 is an example of one type of projector which may be used with video projection system 350. One skilled in the art would understand that any type of video projector may be used with video projection system 350 such as a CRT projector or an LCD projector. Further, DVD player 358 is an example of one type of video source which may be used with video projection system 350. One skilled in the art will understand that any type of video source may be used with video projection system 350.

DLP video projector 354 may include a controller 318 and a bus 324. Controller 318 may include components to control and monitor DLP video projector 354. For example, controller 318 may include a processor, non-volatile memory, and mass storage. All the components of DLP video projector 354 may be coupled to bus 324 to allow all the components to communicate with controller 318 and one another. DLP video projector 354 includes a fan 322 to cool DLP video projector 354. Fan 322 may be coupled to bus 324. DLP video projector 354 also includes a power supply (not shown) coupled to all the components.

DLP video projector 354 contains a light source 302 for generating light to produce a video image. Light source 302 may be, for example, an UHP lamp capable of producing from 50-500 watts of power. Light source 300 may be coupled to bus 324 to communicate with other component. For example, controller 318 or DLP circuit board 310 may control the brightness of light source 302.

Light generated by light source 302 passes though optics 304, 308 and color filter 306. Optics 304 and 308 may be, for example, a condenser and a shaper, respectively, for manipulating the light generated by light source 302. Color filter 306 may be, for example, a color wheel capable of spinning at various speeds to produce various colors.

DLP projector 354 also contains a DLP circuit board 310. DLP circuit board 310 may include a digital micro-mirror device, a processor, and memory. For example, DLP circuit board 310 may be a DARKCHIP2 or DARKCHIP3 DLP chip manufactured by TEXAS INSTRUMENTS. DLP circuit board 310 is coupled to bus 324 to receive the video signal received from input/output ports 320 and to communicate with controller 318. DLP circuit board 310 reflects light from light source 302 using the digital micro-mirrors and generates video based on the video signal to be displayed on display screen 102. DLP circuit board 310 reflects light not used for the video onto light absorber 312. Light reflected by DLP circuit board 310 used for the video passes through lens housing 356 and lens 316. Lens 316 focuses the video to be displayed on display screen 102. Lens housing 356 may include a manual lens moving mechanism or a motor to automatically move lens 316. The manual lens moving mechanism or motor allows the position of lens 316 and, as a result, shift the position of the video displayed on display screen 102. The shifting may be achieved by moving lens 316 in any combination of the x, y, or z directions.

DLP video projector 354 also includes input/output ports 368. Input/output ports 368 may be a single port or multiple ports. Input/output ports 368 enables DLP video projector 354 to receive video signals, receive signals from a remote control device, and output signals to other sources. For example, input/output ports 368 may include ports as illustrated in FIG. 3e or any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 368 may include any port capable of sending or receiving an electrical signal. Input/output ports 368 are coupled to bus 324 and to audio bus 336. Signals input into DLP video projector 354 may be transferred to the various components of DLP video projector 354 via bus 324. Likewise, signals output of DLP video projector 354 may be transferred to input/output ports 368 via bus 324.

DLP video projector 354 also includes DVD player 358. DVD player 358 is composed DVD reader 326. DVD reader 326 may include a spindle motor for turning a DVD disc, a pickup head, and a head amplifier equipped with an equalizer. DVD reader 326 is coupled to a decoder/error correction circuit 328, a content scrambling system 330 for copy protecting DVD contents, a program stream demultiplexer ("PS demultiplexer") 332.

DVD player reads a DVD disc with DVD reader 326 by emitting laser light from the pickup head in order to irradiate the DVD disc with a predetermined wavelength. The reflected light is converted to an electric signal which is then output to the head amplifier. The head amplifier serves to perform signal amplification, waveform shaping and digitization while decoder/error correction circuit 328 serves to perform 8-16 decoding and error correction. Next, content scrambling system 330 performs mutual authentication of the DVD disc and DVD player 358 in order to confirm the authorization.

When the authorization is successfully finished, PS demultiplexer 332 separates the program stream ("PS") as read from the DVD disc into sound and video data in the form of packetized elementary streams ("PES"). Audio stream decoder 334 decodes the PES sound stream with sound compression encoding technology in order to output audio signals. For example, audio stream decoder may utilize sound compression formats such as AAC, AC3, and MPEG. DLP circuit board 310 decodes and processes the video PES which would include video, sub-picture, and navigation data. For example, DLP circuit board 310 may utilize video compression formats such as MPEG 2. The decoded sound stream is transferred to DLP circuit board 310 and DLP circuit board 310 synchronizes sounds, which is transferred to speakers 366 via sound bus 336 and video, which is generated by DLP video projector 354.

One skilled in the art will realize that controller 318 may be utilized in combination with DLP circuit board 310 for producing video and sound from DVD player 358. Further, DLP circuit board 310 or controller 318 may perform audio decoding functions similar to the functions as performed by audio stream decoder 334.

FIG. 3*f* is a block diagram illustrating internal components of DLP video projector 390 consistent with aspects of the present invention. DLP video projector 390 includes all the components of DLP video projector 300. In addition, video projection system 390 includes a temperature sensor 392. Temperature sensor 392 may be any type of sensor capable of measuring the temperature inside of DLP video projector 390. For example, temperature sensor 392 may be a thermocouple. DLP video projector 390 also includes an air pressure sensor 394. Air pressure sensor 394 may be any type of sensor capable of measuring the air pressure inside DLP video projector 390. For example, air pressure sensor 394 may be a piezoelectric crystal sensor. Both temperature sensor 392 and air pressure sensor 394 may be coupled to bus 324. Temperature sensor 392 and air pressure sensor 394 may be controlled by controller 318 or DLP circuit board 310. One skilled in the art will realize that DLP video projector 350 may include a temperature sensor 392 and air pressure sensor 394.

Figure 4A:
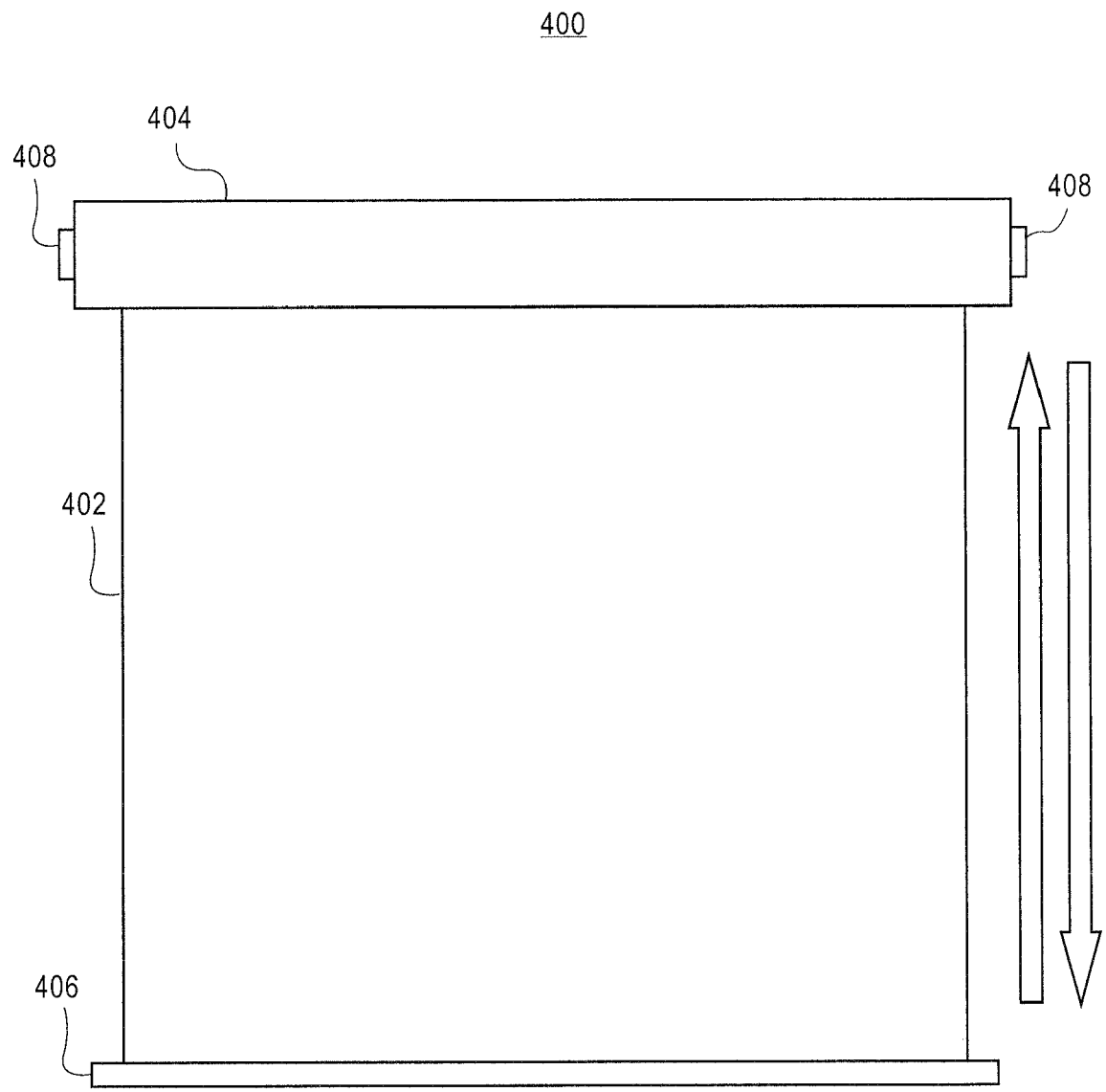
FIGS. 4a and 4b are diagrams illustrating a display screen consistent with aspects of the present invention.

FIG. 4*a* illustrates a detailed view of display screen 400 which may be used as display screen 102 consistent with aspects of the present invention. Display screen 400 is merely an example of one type of display screen which may be used with system 100. One skilled in the art would understand that any type of display screen capable of displaying an image may be used with system 100. Display screen 400 includes a viewing screen 402 that retracts into a housing 404. Viewing screen 400 may be constructed of materials that efficiently reflect the video projected from video projector 104. For example, viewing screen 404 may be constructed of a white or gray vinyl fabric, glass beaded fabric, VIDEO SPECTRA fabric, High Contrast fabric, or High Power fabric. One skilled in the art would realize that the above materials are exemplary and that viewing screen 402 may be constructed of any material or combination of materials that reflects light. Optionally, a weight 406 is attached to the bottom of viewing screen 402 to stabilize viewing screen 402.

Display screen 400 also includes mounting brackets 408 which enable display screen 400 to be attached to a wall or ceiling. FIG. 4 illustrates mounting brackets 408 as located on the sides of housing 404. Mounting brackets 408 may be located on any surface of housing 404 to facilitate the mounting of display screen 400.

Viewing screen 402 may be manually or electrically retracted into housing 404. If viewing screen 402 is manually retracted, housing 404 contains an inertial locking mechanize and roller (not shown) attached to viewing screen 402. The inertial locking mechanize enables a user to apply force to viewing screen 402 in order to retract or extend viewing screen 402. As the viewing screen 402 retracts, viewing screen 402 is wound around the roller.

If viewing screen 402 is electrically retracted, housing 404 contains an electrical motor and roller (not shown) attached to viewing screen 404. To electrically operate viewing screen 402, current is supplied to the electrical motor to activate the motor and wind viewing screen 402 around the roller in order to retract or extend viewing screen 402 into housing 402. The current supplied to the electrical motor may be controlled by a switch (not shown) located on housing 404. Additionally, a wireless receiver (not shown) may be attached to the electrical motor to enable the electrical motor to be controlled remotely. Additionally, a memory may be attached to the motor in order to store different viewing screen positions to be recalled when needed.

Figure 4B:
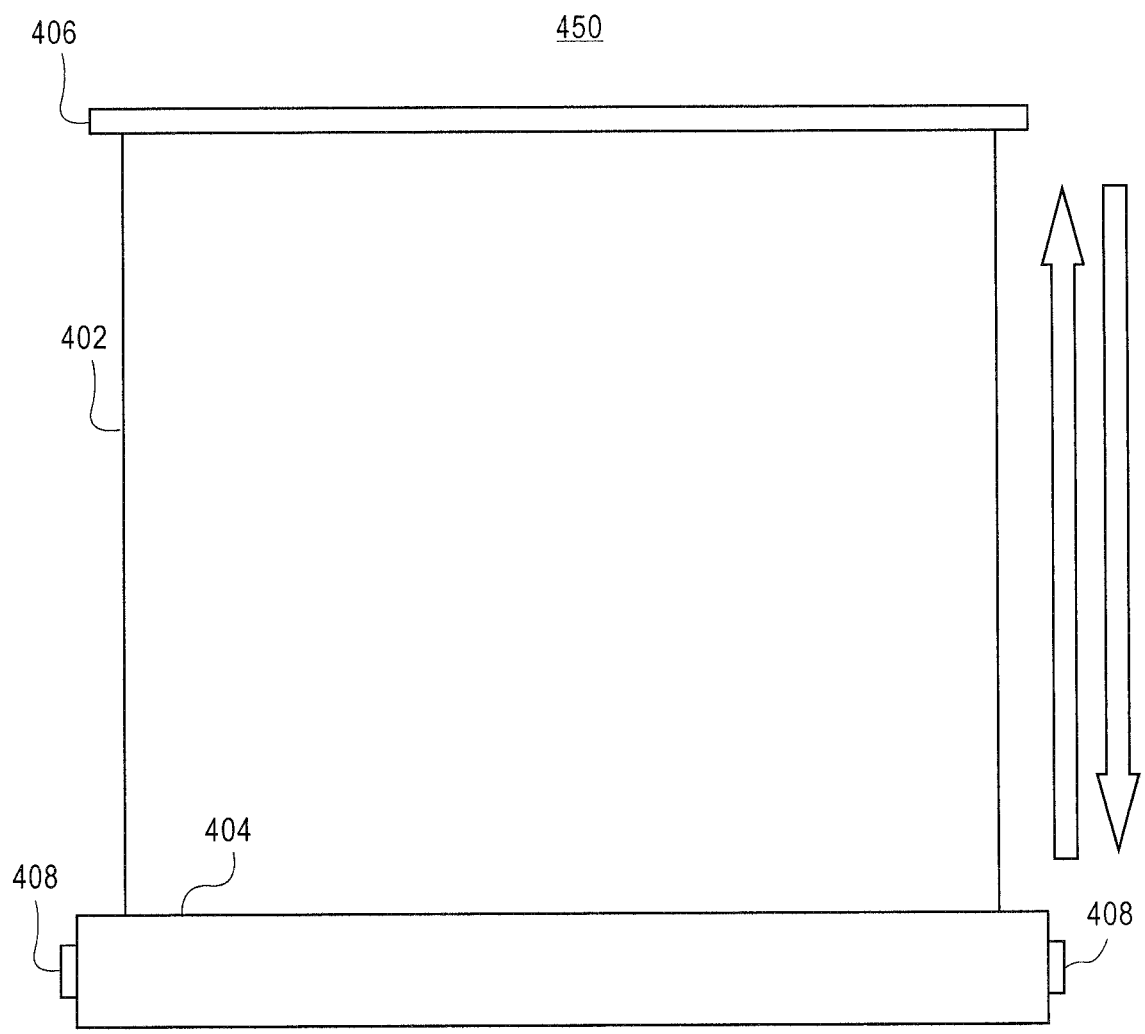

FIG. 4*b* is a diagram illustrating a display screen 450 which may be used as display screen 102 consistent with aspects of the present invention. Display screen 450 includes a viewing screen 402, a housing 404, an optional weight 406, and optional mounting brackets 402 as display screen 400. Display screen 450 functions in the same manner as display screen 400 except that viewing screen 402 extends upward out of housing 404. Display screen 450 is merely an example of one type of display screen which may be used with system 100.

Figure 5:
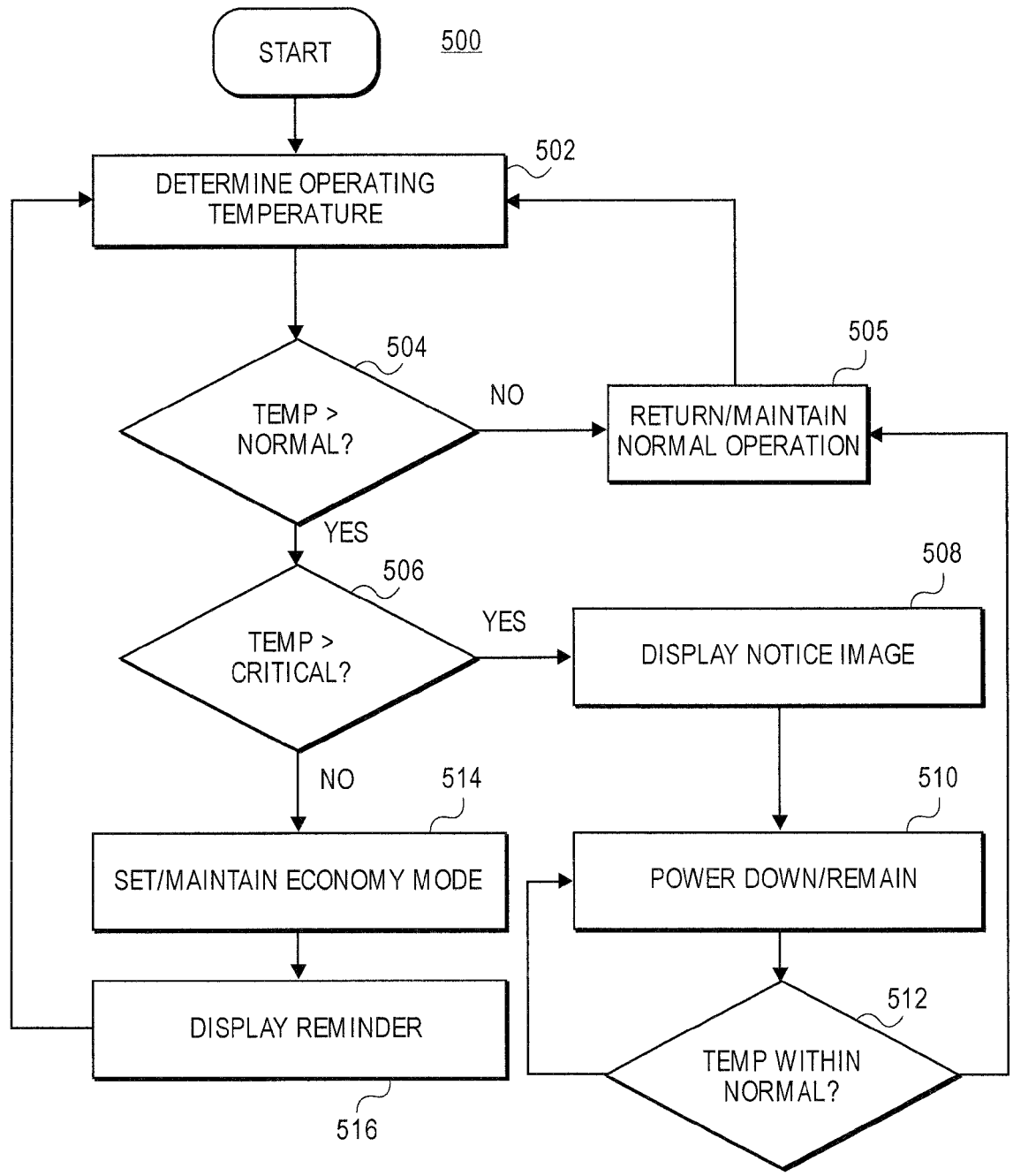
FIG. 5 is a flow chart illustrating a method of operating a video projector consistent with aspects of the present invention.

FIG. 5 illustrates a method 500 for operating video projector 104 consistent with aspects of the present invention. Method 500 determines the operating temperature of video projector 104 and modifies the operation of video projector 104 based on the reading. Method 500 may be performed in a variety of situations. For example, video projector 104 may initiate method 500 once video projector 104 is powered up. Then, video projector 104 may continually perform method 500 until video projector 104 is powered down. Further, video projector may perform method 500 in response to a user command. One skilled in the art will realize that the above situations for performing method 500 are exemplary and that method 500 may be performed in any situation in which video projector 104 may be utilized.

Method 500 may be performed by any control and processing hardware, software, or combination thereof contained in video projector 104. For example, if DLP projector 300 is utilized, method 500 may be performed by controller 318, by DLP circuit board 310, by software stored in controller 318, by software stored in DLP circuit board 310, or any combination thereof. One skilled in the art will realize that method 500 being performed by the components of DLP projector 300 is exemplary and that method 500 may be performed by any hardware, software, or combination thereof capable of performing processing and control functions of the various components of video projector 104.

As illustrated in FIG. 5, video projector 104 first determines the operating temperature of the video projector (stage 502). The operating temperature may be the temperature inside video projector 104, the temperature of components of video projector 104, the temperature outside video projector 104, the ambient temperature of the environment, or combinations thereof.

Video projector 104 may determine the operating temperature when it is first power up. Likewise, the video projector 104 may determine the operating temperature anytime after the video projector is powered up.

Figure 3G:
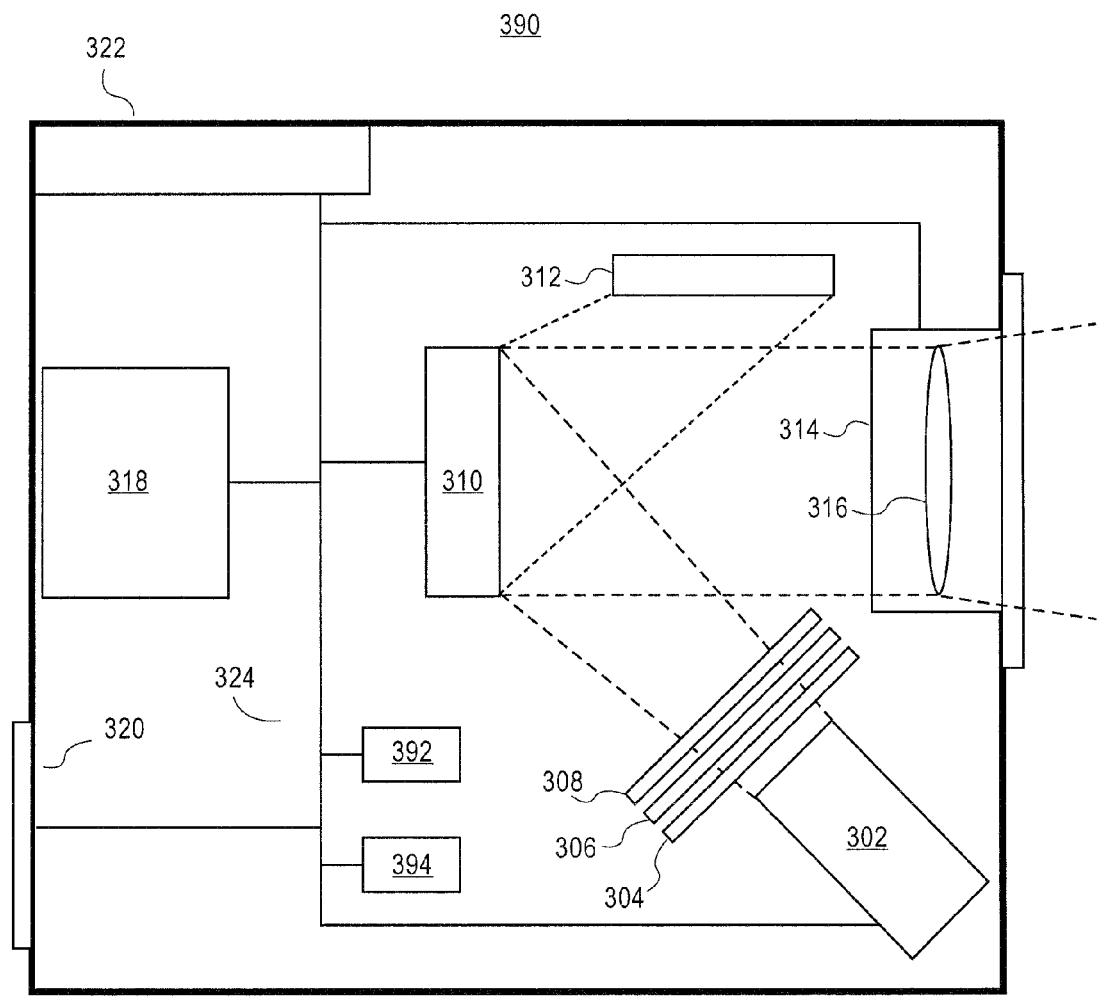
FIG. 3g is a diagram illustrating a DLP video projector consistent with aspects of the present invention.

Once video projector 104 determines the operating temperature, video projector 104 determines if the operating temperature is above a normal operating temperature range (stage 504). For example, the operating temperature range may be between approximately 0 degrees Celsius and approximately 35 degrees Celsius. The temperature may be measured by a temperature sensor, for example as illustrated in FIG. 3g. One skilled in the art will realize that the normal operating temperature range may be any temperature capable of support by video projector 104 without damaging video projector 104. The normal operating temperature range may be set by the manufacturer of video projector 104. Also, a user of video projector 104 may set the normal operating temperature range.

If the operating temperature is not above the operating temperature range, video projector 104 maintains normal operation (stage 505). If the operating temperature is above the operating temperature range, video projector 104 determines if the operating temperature is above a critical temperature (stage 506). If video projector is above the critical temperature, video projector 104 is in danger of overheating. As such, video projector 104 displays a notice image (stage 508). The notice image is projected as a normal video from video projector 104. Then, video projector 104 powers down to prevent any damage (stage 510). For example the critical temperature may be 45 degrees Celsius.

One skilled in the art will realize that the critical temperature may be any temperature capable of support by video projector 104 without damaging video projector 104. The critical temperature may be set by the manufacturer of video projector 104. Also, a user of video projector 104 may set the critical temperature.

Video projector stays powered down until the temperature returns to the normal range (stage 512 and stage 505). Video projector 104 may also display the notice image if a user attempts to power up the video projector after video projector 104 has reached the critical temperature. Video projector 104 may display an image informing the user that video projector 104 can return to normal mode.

If the operating temperature is above the operating temperature range but below the critical temperature, video projector 104 sets itself into economy mode (stage 514). In economy mode, video projector may reduce the brightness of its light source by reducing the power to its light source. For example, the brightness may be reduced by 20% to 80% of normal brightness. For example, if DLP video projector 300 is utilized, controller 318 or DLP circuit board 310 may reduce the brightness of light source 302.

While operating in economy mode, video projector 104 display a reminder image to remind the user that video projector 104 is in economy mode (stage 516). Video projector 104 may display the reminder image periodically. Video projector may display the reminder image every 5 minutes while operating in economy.

Once the operating temperature returns within the normal range, video projector 104 returns to normal operation (stage 502-505). Video projector 104 may display an image informing the user that video projector 104 has returned to normal mode. If the operating temperature is not above the operating temperature range, video projector 104 continues to operate normally and will continue to measure the operating temperature (stage 502).

Additionally, the temperature at which video projector 104 returns to normal mode from economy mode may be set different from the normal operating temperature range. For example, the temperature may be set to a lower value than the upper value of the normal operating temperature range. For example, if the upper value is 35 degrees Celsius, the temperature at which video projector 104 returns to normal mode from economy mode may be set to 33 degrees Celsius. By setting the temperature at which video projector 104 returns to normal mode from economy mode different from the normal operating temperature range, video projector 104 may be prevented from oscillating between economy and normal modes if the operating temperature is varying around the limits of the normal operating temperature range.

Optionally, during the method 500, video projector may measure the air pressure and modify the normal operating temperature range and the critical temperature. For example, if air pressure is higher, then the air is "thicker" and video projector 104 will be easier to cool. Accordingly, the normal operating temperature range and the critical temperature may be increased. If air pressure is lower, then the air is "thinner" and video projector will be harder to cool. Accordingly, the normal operating temperature range and the critical temperature may be decreased. The air pressure may be measured by an air pressure sensor, for example as illustrated in FIG. 3g.

Other aspects of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for operating a video projector, comprising:
determining an operating temperature;
determining an air pressure within the video projector;
modifying a normal operating temperature range for the video projector based on the air pressure, wherein an upper value of the normal operating temperature range is raised when the air pressure increases and the upper value of the normal operating temperature range is lowered when the air pressure decreases;
determining if the operating temperature is above the normal operating temperature range for the video projector;
setting the video projector in an economy mode if the operating temperature is above the upper value of the normal operating temperature range, including immediately reducing power supplied to a light source of the video projector by approximately 20%; and
setting the video projector to a normal mode from the economy mode when the operating temperature is significantly below the upper value of the normal operating temperature range.

2. The method of claim 1, wherein the normal operating temperature range is between approximately 0 degrees Celsius and approximately 35 degrees Celsius.

3. The method of claim 1, further comprising:
continually measuring the operating temperature; and
maintaining the video projector in the economy mode until the operating temperature is more than five percent below the upper value of the normal operating temperature range.

4. The method of claim 3, further comprising:
determining if the operating temperature is above a critical temperature;
powering down the video projector if the operating temperature is above the critical temperature.

5. The method of claim 4 wherein the critical temperature is approximately 45 degrees Celsius.

6. The method of claim 4, further comprising:
displaying a notice image before powering down the video projector.

7. The method of claim 6, further comprising:
displaying the notice image in response to a command to power up after powering down.

8. The method of claim 4, further comprising:
modifying the critical temperature based on the air pressure.

9. A video device comprising:
a video projector;
a controller coupled to the video projector;
a light source coupled to the controller for illuminating the video projector to produce video;
a temperature sensor coupled to the controller;
an air pressure sensor coupled to the controller and within the video projector;
logic coupled to the controller, the temperature sensor, and the light source for determining an operating temperature;
logic coupled to the controller, the temperature sensor, the air pressure sensor, and the light source for determining if the operating temperature is above a normal operating temperature range for the video projector, wherein an upper value of the normal operating temperature range is raised when the air pressure increases and the upper value of the normal operating temperature range is lowered when the air pressure decreases;
logic coupled to the controller, the temperature sensor, and the light source for setting the video projector in an economy mode if the operating temperature is above the upper value of the normal operating temperature range, including logic for immediately reducing power supplied to the light source by approximately 20%; and
logic for setting the video projector to a normal mode from the economy mode when the operating temperature is significantly below the upper value of the normal operating temperature range.

10. The video device of claim 9, further comprising:
logic coupled to the controller, the air pressure sensor, and the light source for determining if the operating temperature is above a critical temperature and powering down the video projector if the operating temperature is above the critical temperature.

11. The video device of claim 9, wherein the logic for setting the video projector to a normal mode further comprises:
logic for maintaining the video projector in the economy mode until the operating temperature is more than five percent below the upper value of the normal operating temperature range.

* * * * *